United States Patent
Piel

(10) Patent No.: US 11,042,845 B2
(45) Date of Patent: Jun. 22, 2021

(54) ACH TRANSACTION AUTHENTICATION SYSTEMS AND METHODS

(71) Applicant: MASTERCARD INTERNATIONAL INCORPORATED, Purchase, NY (US)

(72) Inventor: Brian Piel, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 112 days.

(21) Appl. No.: 15/806,113

(22) Filed: Nov. 7, 2017

(65) Prior Publication Data
US 2019/0139005 A1 May 9, 2019

(51) Int. Cl.
*G06Q 20/02* (2012.01)
*G06Q 20/40* (2012.01)
*G06Q 20/12* (2012.01)

(52) U.S. Cl.
CPC .......... *G06Q 20/023* (2013.01); *G06Q 20/12* (2013.01); *G06Q 20/40* (2013.01); *G06Q 20/405* (2013.01)

(58) Field of Classification Search
CPC .......... G06Q 20/40145; G06Q 20/382; G06Q 20/322; G06Q 20/102; G06Q 20/3224; G06Q 20/4014; G06Q 20/385; G06Q 20/023; G06Q 20/12; G06Q 20/40; G06Q 20/405; H04W 4/02; H04W 12/06
USPC .......................................................... 705/44
See application file for complete search history.

(56) References Cited

U.S. PATENT DOCUMENTS

| | | |
|---|---|---|
| 7,191,151 B1 | 3/2007 | Nosek |
| 7,440,923 B1 | 10/2008 | Compiano |
| 7,447,663 B1 | 11/2008 | Barker et al. |
| 7,461,780 B2 | 12/2008 | Potts et al. |
| 8,025,216 B2 | 9/2011 | Potts et al. |

(Continued)

FOREIGN PATENT DOCUMENTS

| | | |
|---|---|---|
| CA | 2435909 A1 | 8/2002 |
| WO | 2000030051 A1 | 5/2000 |

OTHER PUBLICATIONS

Extended European Search Report for EP Application No. 18199660.4, dated Dec. 19, 2018, 8 pages.

*Primary Examiner* — Scott C Anderson
*Assistant Examiner* — Marla Hudson
(74) *Attorney, Agent, or Firm* — Armstrong Teasdale LLP

(57) ABSTRACT

An authentication computing device, including a processor in communication with a memory, for authenticating an ACH transaction processed over an ACH network is provided. The processor is programmed to register a payee with the authentication computing device, and to receive an authentication request for an electronic ACH transaction to transfer funds from a payor account to a payee account. The request is received from a first client computing device and includes an account identifier associated with the payor account. The processor is also programmed to transmit an authentication challenge to a second client computing device based on account data associated with the account identifier. The processor is further programmed to receive a response to the authentication challenge, determine whether the account data has been authenticated based on the received challenge response, and transmit an authentication response to the payee based on the determination.

18 Claims, 8 Drawing Sheets

(56) References Cited

U.S. PATENT DOCUMENTS

| | | | |
|---|---|---|---|
| 8,326,766 B2 | 12/2012 | Hirka et al. | |
| 8,589,295 B2 | 11/2013 | Sorbe et al. | |
| 8,606,661 B2 | 12/2013 | Clark et al. | |
| 9,171,303 B2 | 10/2015 | Potts et al. | |
| 9,224,143 B2 | 12/2015 | Potts et al. | |
| 10,169,937 B1* | 1/2019 | Zwink | G06F 21/31 |
| 2006/0064380 A1* | 3/2006 | Zukerman | G06Q 20/10 |
| | | | 705/44 |
| 2006/0131395 A1 | 6/2006 | Potts et al. | |
| 2006/0229961 A1* | 10/2006 | Lyftogt | G06Q 20/108 |
| | | | 705/35 |
| 2007/0198404 A1 | 8/2007 | Hirka | |
| 2008/0046362 A1 | 2/2008 | Easterly | |
| 2009/0065573 A1 | 3/2009 | Potts et al. | |
| 2009/0164370 A1 | 6/2009 | Sorbe et al. | |
| 2010/0250406 A1 | 9/2010 | Clark et al. | |
| 2011/0022515 A1 | 1/2011 | Tallitsch et al. | |
| 2012/0123943 A1 | 5/2012 | Potts et al. | |
| 2013/0124414 A1 | 5/2013 | Roach et al. | |
| 2013/0151325 A1 | 6/2013 | Poidomani et al. | |
| 2013/0173463 A1* | 7/2013 | Stewart | G06Q 20/04 |
| | | | 705/39 |
| 2014/0214680 A1 | 7/2014 | Potts et al. | |
| 2014/0344158 A1 | 11/2014 | Hirka et al. | |
| 2015/0019402 A1* | 1/2015 | Berlin | G06Q 40/025 |
| | | | 705/38 |
| 2015/0081553 A1 | 3/2015 | Smith | |
| 2015/0302407 A1 | 10/2015 | Kulakowski | |
| 2017/0053280 A1* | 2/2017 | Lishok | G06Q 20/4014 |

\* cited by examiner

ACH TRANSACTION AUTHENTICATION SYSTEMS AND METHODS

BACKGROUND

This disclosure relates generally to payment transactions made over the automated clearing house (ACH) network and, more specifically, to systems and methods for authenticating ACH payment transactions.

ACH transactions are widely utilized for bill payment transactions such as utility bills, rent, mortgages, and loans. In these cases, a user provides an account number and routing number for direct transfer of funds from the user's payor account to a merchant's payee account. ACH transactions are generally known for having fewer fees and faster processing times than credit/debit transactions because funds are transferred directly between accounts (as opposed to funds being paid by a credit/debit card issuer first and later by the user from a payor checking or savings account). However, ACH transactions also have no authentication process to tie the user/consumer to the account number being used and no guarantee of funds from the payor account. Accordingly, retail-type merchants (e.g., item/goods based merchants and point of sale (POS) transactions), typically utilize non-ACH payment methods, such as credit card and debit card payment transactions.

While credit and debit transactions may be associated with slower processing times and higher fees (including a per transaction fee and/or a fee based on a percentage of each transaction amount), there is a real-time authorization process and guarantee of funds provided for each transaction. Consequently, the rate of fraud among ACH payment transactions is higher than the rate of fraud among credit/debit payment transactions due to less rules in place and less stringency overall regarding authentication and/or authorization. Accordingly, a system is needed that provides the faster processing times and reduced processing fees with ACH, and includes an authentication process that ties a user/consumer to a payor account being used. Further, a system is needed in which ACH transactions amounts can be indicated as sufficiently covered by a payor account prior to processing over the ACH network.

BRIEF DESCRIPTION OF THE DISCLOSURE

In one aspect, an authentication computing device for authenticating an ACH transaction processed over an ACH network is provided. The authentication computing device includes a processor in communication with a memory. The processor is programmed to register a payee with the authentication computing device, and to receive an authentication request for an electronic ACH transaction to transfer funds from a payor account to a payee account. The request is received from a first client computing device and includes an account identifier associated with the payor account. The processor is also programmed to transmit an authentication challenge to a second client computing device based on account data associated with the account identifier, the account data being received from an issuer and stored in the memory. The processor is further programmed to receive a response to the authentication challenge, determine whether the account data has been authenticated based on the received challenge response, and transmit an authentication response to the payee based on the determination.

In another aspect, a method for authenticating an ACH transaction processed over an ACH network is provided. The method is performed using an authentication computing device including a processor in communication with a memory. The method includes registering a payee with the authentication computing device, and receiving an authentication request for an electronic ACH transaction to transfer funds from a payor account to a payee account, the request received from a first client computing device, the request including an account identifier associated with the payor account. The method further includes transmitting an authentication challenge to a second client computing device based on account data associated with the account identifier, the account data being received from an issuer and stored in the memory, and receiving a challenge response to the authentication challenge. The method also includes determining whether the account data has been authenticated based on the received challenge response, and transmitting an authentication response to the payee based on the determination.

In yet another aspect, a non-transitory computer-readable storage medium having computer-executable instructions embodied thereon is provided. When executed by an authentication computing device including at least one processor coupled to a memory, the computer-executable instructions cause the authentication computing device to register a payee with the authentication computing device, and receive an authentication request for an electronic ACH transaction to transfer funds from a payor account to a payee account, the request received from a first client computing device, the request including an account identifier associated with the payor account. The computer-executable instructions further cause the authentication computing device to transmit an authentication challenge to a second client computing device based on account data associated with the account identifier, the account data being received from an issuer and stored in the memory, and receive a challenge response to the authentication challenge. The computer-executable instructions also cause the authentication computing device to determine whether the account data has been authenticated based on the received challenge response, and transmit an authentication response to the payee based on the determination.

BRIEF DESCRIPTION OF THE DRAWINGS

FIGS. 1-7 show example embodiments of the methods and systems described herein.

FIG. 1 is an example embodiment of an automated clearinghouse (ACH) payment processing system.

FIG. 2 is an example embodiment of an ACH transaction authentication system including an authentication computing device in accordance with one embodiment of the present disclosure.

FIG. 4 illustrates an example embodiment of a configuration of a remote device for use in the system shown in FIG. 2.

FIG. 5 illustrates an example embodiment of a configuration of a server system for use in the system shown in FIG. 2.

FIG. 6 is a flowchart of an example process for providing authentication of ACH payment transactions using the system shown in FIG. 2.

FIG. 7 is a diagram of components of an example embodiment of a computing device that may be used in the ACH transaction authentication system shown in FIG. 2.

Figure 1:
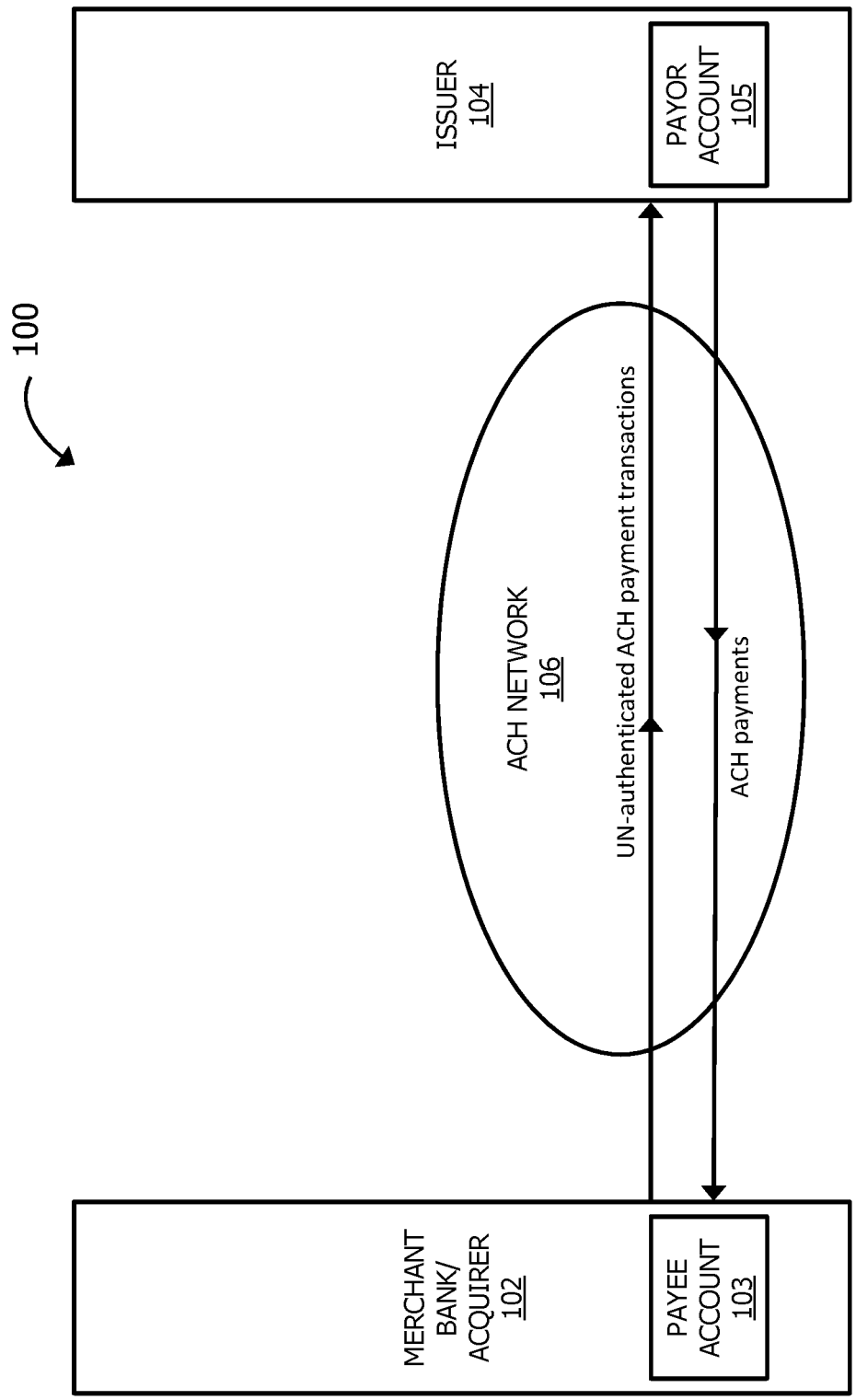

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The embodiments described herein include an ACH transaction authentication system, an authentication computing device, and methods for authenticating an ACH transaction processed over an ACH network. In the exemplary embodiment, an ACH transaction authentication system includes a merchant (e.g., a supplier or seller) and associated merchant bank/acquirer, a user (e.g., a consumer), and an issuer (e.g., the bank or financial institution issuing an account to the user). Merchants enroll or register themselves with the system (e.g., with the authentication computing device). Registered merchants may request authentication of an account identifier (e.g., account number) input by a user, and subsequently receive an authentication response indicating that the transaction has either passed or failed the authentication process. An authentication challenge is created and transmitted by the authentication computing device, and a challenge response input by the user is received by the authentication computing device. The challenge response is used to authenticate the transaction based on account data associated with the account identifier. The authentication process, including an authentication challenge and challenge response, allows for lower risk to both merchants (e.g., with respect to unpaid transactions) and consumers (e.g., with respect to unauthorized transactions). However, there is currently no system capable of providing authentication to ACH transactions to the benefit of both merchants and consumers. The systems and methods described herein resolve this deficiency.

In the example embodiment, the ACH transaction authentication system includes an authentication computing device that includes and/or is in communication with one or more client computing devices (such as merchant-associated computing devices, user-associated computing devices, an issuer, and an ACH network). The authentication computing device is configured to (i) register a payee with the authentication computing device, (ii) receive an authentication request for an electronic ACH transaction to transfer funds from a payor account to a payee account, the request received from a first client computing device, the request including an account identifier associated with the payor account, (iii) transmit an authentication challenge to a second client computing device based on account data associated with the account identifier, the account data being received from an issuer and stored in the memory, (iv) receive a challenge response to the authentication challenge, (v) determine whether the account data has been authenticated based on the received challenge response, and (vi) transmit an authentication response to the payee based on the determination. The authentication computing device is a specifically configured computing device that is capable of functioning as described herein, and, in some embodiments, includes a dedicated computing device associated solely with the ACH transaction authentication system. The authentication computing device includes a processor in communication with a memory.

The ACH transaction authentication system further includes a database in wired and/or wireless communication with the authentication computing device. In some embodiments, the database is a centralized database that is integral to the authentication computing device, or in alternative embodiments the database is a separate component and external to the authentication computing device. The database is accessible to the authentication computing device and is configured to store and/or otherwise maintain a variety of information, as described further herein. For example, the database may store account data, registration rules/modules, challenge rules/modules, authentication rules/modules, and/or any other information. The database is configured to store data to more efficiently provide account data to enable the authentication process. Subsequently, based on the account data most recently received from the issuer, the account data may be updated and re-cached to the database.

The ACH transaction authentication system described herein, including the authentication computing device, provides authentication for an electronic ACH transaction processed over an ACH network for transferring funds from a payor account to a payee account.

The methods and systems described herein may be implemented using computer programming or engineering techniques including computer software, firmware, hardware, or any combination or subset therefor. At least one of the technical problems addressed by this system includes: (i) lack of authentication for ACH transactions; (ii) higher risk associated for a user/payor in providing actual checking or savings account numbers when making ACH payment; (iii) lack of ACH transaction utilization for retail (e.g., items/goods-based) merchants; (iv) higher risk associated for a merchant utilizing ACH transactions for payment when no indication of sufficient funds in payor account is available; (v) longer transaction processing time for merchants and consumers utilizing non-ACH payment methods; and (vi) higher transaction processing costs for merchants utilizing non-ACH payment methods.

The technical effect of the systems and methods described herein is achieved by performing at least one of the following steps: (i) registering a payee with the authentication computing device; (ii) receiving an authentication request for an electronic ACH transaction to transfer funds from a payor account to a payee account, the request received from a first client computing device, the request including an account identifier associated with the payor account; (iii) transmitting an authentication challenge to a second client computing device based on account data associated with the account identifier, the account data being received from an issuer and stored in the memory; (iv) receiving a challenge response to the authentication challenge; (v) determining whether the account data has been authenticated based on the received challenge response; and (vi) transmitting an authentication response to the payee based on the determination.

The resulting technical effect achieved by the systems and methods described herein is at least one of: (i) improved authentication for ACH transactions; (ii) lower risk for users/payors associated with providing actual account numbers when making ACH payments; (iii) increased ACH transaction availability and desirability for retail (e.g., goods-based merchants); (iv) lower risk for merchants utilizing ACH transactions by providing a funds amount indicator associated with the payor account; (v) faster transaction processing time for merchants and consumers by utilizing ACH payment methods; and (vi) lower transaction processing costs for merchants by utilizing ACH payment methods.

As will be appreciated, based on the description herein, the technical improvement in ACH payment systems as described is a computer-based solution to a technical deficiency or problem that is itself rooted in computer technology (i.e., the problem itself derives from the use of computer technology). More specifically, the technical problems and inefficiencies created by conventional ACH systems and related methods (e.g., lack of authentication capabilities, susceptibility to fraudulent activity, etc.) are the result of an implementation and use of computers in those ACH systems and methods. The present invention improves upon the conventional methods and systems in the manners described herein. Thus, the inefficiencies or technical problems created by the conventional ACH methods and systems as described herein are solved (i.e., the desired outcome of achieving adequate authentication, authorization, and fraud detection and prevention are achieved) by the methods and systems described and particularly claimed herein.

In one embodiment, a computer program is provided, and the program is embodied on a computer-readable medium. In an example embodiment, the ACH transaction authentication system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the ACH transaction authentication system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to providing an on-demand ecosystem in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example embodiment of an automated clearinghouse (ACH) payment processing system. The present disclosure relates to an ACH processing system 100, in which funds are transferred directly and electronically from a payor account to a payee account over an ACH network. For a conventional ACH payment transaction, a payor provides an account number (and also a routing number, in some cases) to a merchant bank/acquirer 102. The acquirer 102 typically accumulates transactions over a certain period of time (such as one business day) and then transmits the transactions as a batch to an issuer 104 over an ACH network 106. Issuer 104 is the bank or financial institution that issued an account 105 to the payor. Merchant bank/acquirer 102 may be associated with a bank or financial institution providing a loan or other financial product to a payor. In some instances, the merchant bank/acquirer is associated with a particular service-providing merchant such as a utility company. If the payor has provided an accurate account number, funds will be transferred electronically and directly from payor account 105 to payee account 103. No further authentication of the payor or their association with the provided account number, or further authorization by the issuer to release funds from the payor account 105 is required or included in the ACH transaction.

Figure 2:
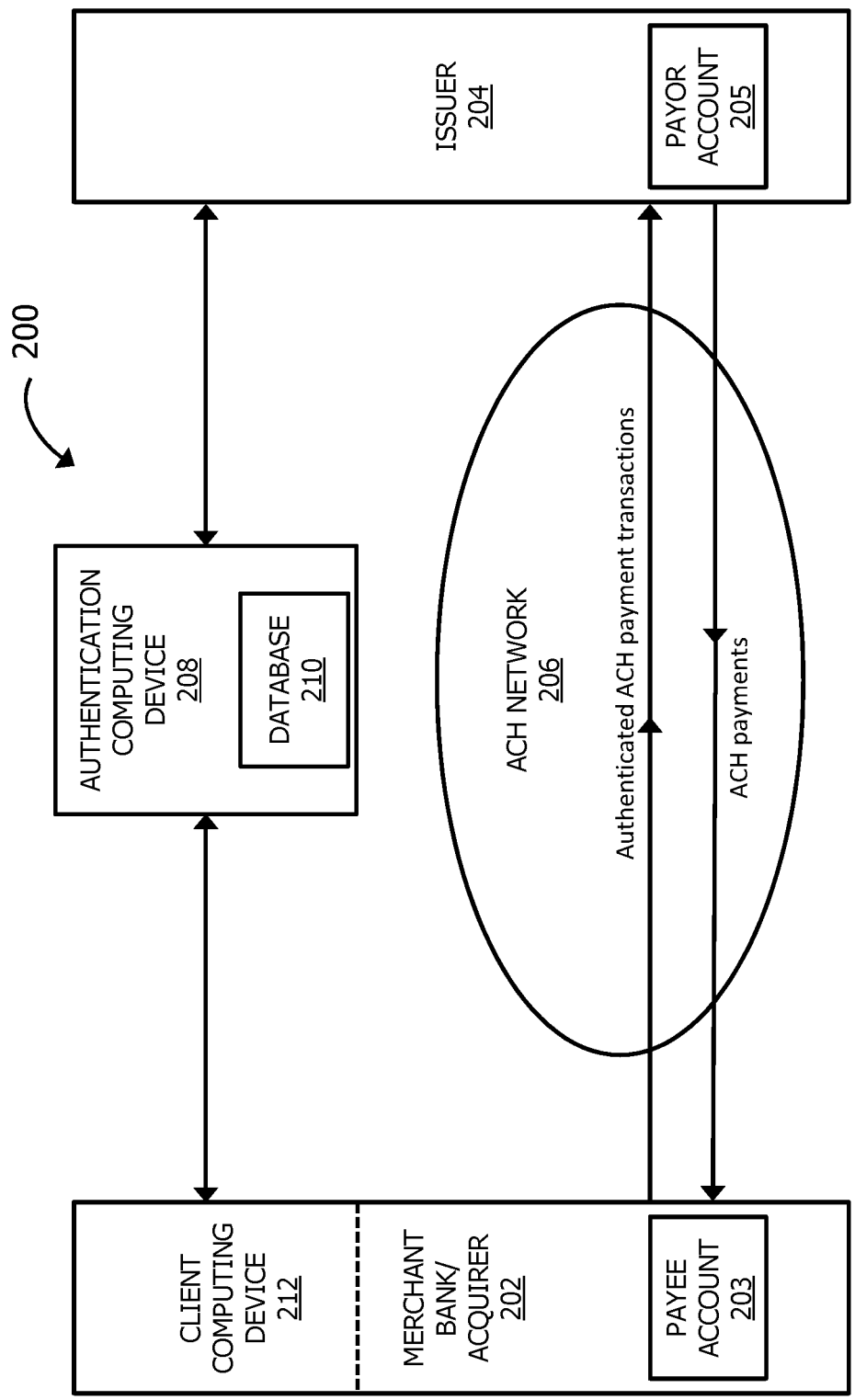

FIG. 2 is an example embodiment of an ACH transaction authentication system 200 including an authentication computing device 208. Authentication computing device 208 includes at least one processor in communication with a memory. Authentication computing device 208 is in communication with a database (memory) 210, client computing device(s) 212, merchant/acquirer computing device(s) 202, and issuer/financial institution 204. ACH network 206 may be similar to payment network 106 as shown in FIG. 1. ACH network 206 includes at least a payment processor for processing ACH payment transactions. System 200 may further include issuer computing device 204 (where the issuer is a bank or financial institution associated with a payor and issues payment accounts to the payor), acquirer computing device 202 (where the acquirer is a bank or financial institution associated with a merchant or merchant bank), and/or client computing device(s) 212 that may be associated with a merchant or payor. Database 210 contains information on a variety of matters, including: account data, registered payee/merchant listings, registration modules, challenge modules, authentication modules and/or any other information.

In the example embodiment, the authentication computing device 208 is configured to receive account data from an issuer 204. Account data is stored in the memory/database 210 of the authentication computing device 208 and generally includes data that only a legitimate user (such as the payor(s) associated with a payor account 205) would be familiar with. For example, account data may include passwords, security questions and answers, security images, etc. In some embodiments, account data may further include a funds amount that indicates an amount of available funds in payor account 205. In some embodiments, database 210 is stored on authentication computing device 208. In alternative embodiments, database 210 is stored remotely from authentication computing device 208 and may be non-centralized.

In the example embodiment, authentication computing device 208 is configured to authenticate that a user providing an account identifier (such as an account number) is associated with the payor account 205 indicated by the account identifier. In one embodiment, authentication computing device 208 is configured to transmit an authentication challenge (e.g., in the form of at least one question and/or at least one authentication code) to a client computing device 212. In another embodiment, authentication computing device 208 includes a risk-based decisioning (RBD) component or is in communication with a RBD component that evaluates the ACH transaction being initiated and generates a risk score for the transaction indicating how likely the transaction is fraudulent. In some cases, the RBD component may score the transaction as a low fraud risk, and thus, may approve the transaction without any further authentication steps. However, in other cases, the RBD component may score the transaction as a high fraud risk, and thus, may initiate the authentication challenge process where at least one question is directed to the payor to further authenticate the payor.

For example, an authentication challenge may be provided by an authentication service such as a 3-D Secure® protocol (3DS) (e.g., EMV® 3-D Secure by EMVCo., LLC.; Verified by Visa by Visa International Service Association, Delaware; and Mastercard SecureCode® by Mastercard International Incorporated, Purchase, N.Y.). This extra step of presenting a challenge question to the payor is to help confirm that they are the legitimate payor associated with the account and account number presented. There is less fraud risk associated with these authenticated ACH transactions. The authentication computing device receives input from the payor (e.g., a user providing the account identifier/number associated with payor account 205) in response to the challenge. Based on the challenge response, authentication computing device 208 determines whether the user is associated with the payor account 205 and transmits an authentication response based on the determination to the payee/merchant. The merchant bank/acquirer 202 may then include only authenticated transactions over the ACH network for direct electronic funds transfer from payor account 205 to payee account 203.

Additionally or alternatively, authentication computing device 208 may also utilize the RBD component to determine whether the step-up challenge is needed. In other words, authentication may be performed in some cases without the stepped-up challenge. For example, the RBD component may identify one or more pieces of information about the ACH transaction that are used to "score" the transaction for risk (e.g., potential fraud). More specifically, the RBD component may score the ACH transaction based on several aspects including device information, and account information associated with the transaction. Device information may include information about the computing device used during the ACH transaction, such as a unique hardware identifier, or an IP address associated with the device, etc. Account information may include information about the account being used, such as dates of use, name on the account or address associated with the account, etc. In one embodiment, the RBD component generates a risk score for the ACH transaction based on the device information and/or account information used for the transaction. The RBD component may then send the score and/or risk-based decisioning data to an issuer's ACS (access control system) for further consideration. Using this score and/or risk-based data, the issuer's ACS may then determine whether or not the suspect consumer should be further authenticated (e.g., through the 3DS "step-up" challenge) or whether the transaction can be verified without further challenges.

In the example embodiment, ACH transaction authentication system 200 further includes a plurality of client subsystems, also referred to as client/remote systems such as acquirer 202 computing device, issuer 204 computing device, and client computing devices 212. As described in greater detail herein, client 212 and acquirer 202 computing devices may be associated with authentication computing device 208 by registering with authentication computing device 208. Computing devices 202, 204, 212 are computers including a web browser, such that authentication computing device 208 is accessible to user computing devices 202, 204, 212 using the Internet. Computing devices 202, 204, 212 may be any device capable of interconnecting to the Internet including a mobile computing device, such as a laptop or desktop computer, a web-based phone (e.g., a "smartphone"), a personal digital assistant (PDA), a tablet or phablet, a fitness wearable device, a smart refrigerator or other web-connectable appliance, a "smart watch" or other wearable device, or other web-connectable equipment. Although one acquirer 202 computing device, issuer 204 computing device, and client computing device 212 is shown in FIG. 2, it should be understood that ACH transaction authentication system 200 may include any number of acquirer 202 computing devices, issuer 204 computing devices, and/or client computing devices 212.

In one embodiment, authentication computing device 208 is configured to communicate with an acquirer 202 computing device or client computing device 212. Computing devices 202 and 212 are configured to display an app, for example, at a user interface (not shown) of computing device 202 and 212. Merchants/payees associated with acquirer 202 may access the app to register/enroll with the authentication computing device 208. In some embodiments, a user associated with payor account 205 may access the app to register/enroll with authentication computing device 208. In these embodiments, a user may elect to receive a communication (e.g., separate from the authentication process) whenever an authentication is requested for a payor account(s) associated with user. In certain embodiments, the merchants/payees provide merchant-related data to authentication computing device 208 to facilitate generation of merchant/payee profiles and/or listings, which are stored in database 210. In some embodiments, the app providing access to the authentication computing device may have inter-app integration functionality, such that the ACH transaction authentication services of the app may be integrated with, for example, budgeting, invoicing, or payment tracking services of another application.

Database 210 is communicatively coupled to authentication computing device 208. In other embodiments, database 210 is integrated with authentication computing device 208 or ACH network 206 (e.g., a payment processor). Database 210 is configured to receive, store, and transmit data for the authentication computing device 208. In particular, database 210 may store account data, registered payee/merchant listings, registration modules, challenge modules, authentication modules and/or any other information.

In the illustrated embodiment, ACH network 206 is configured to process ACH transactions thereover. ACH network 206 is in communication with a plurality of issuers/financial institutions 202 and 204 (e.g., banks), although only one acquirer 202 and one issuer 204 are shown for clarity. Issuer 204 maintains one or more payment accounts 205 associated with a user (e.g., a payor), such as a checking or savings account. In some embodiments, authentication computing device 208 is integral to ACH network 206, as well as in direct communication with issuer 204. In these embodiments, an authentication request may be received at the authentication computing device 208 via web call (i.e., not via additional communication over the ACH network). In some embodiments, authentication computing device is integral to issuer 204 and in direct communication with ACH network 206.

Figure 3A:
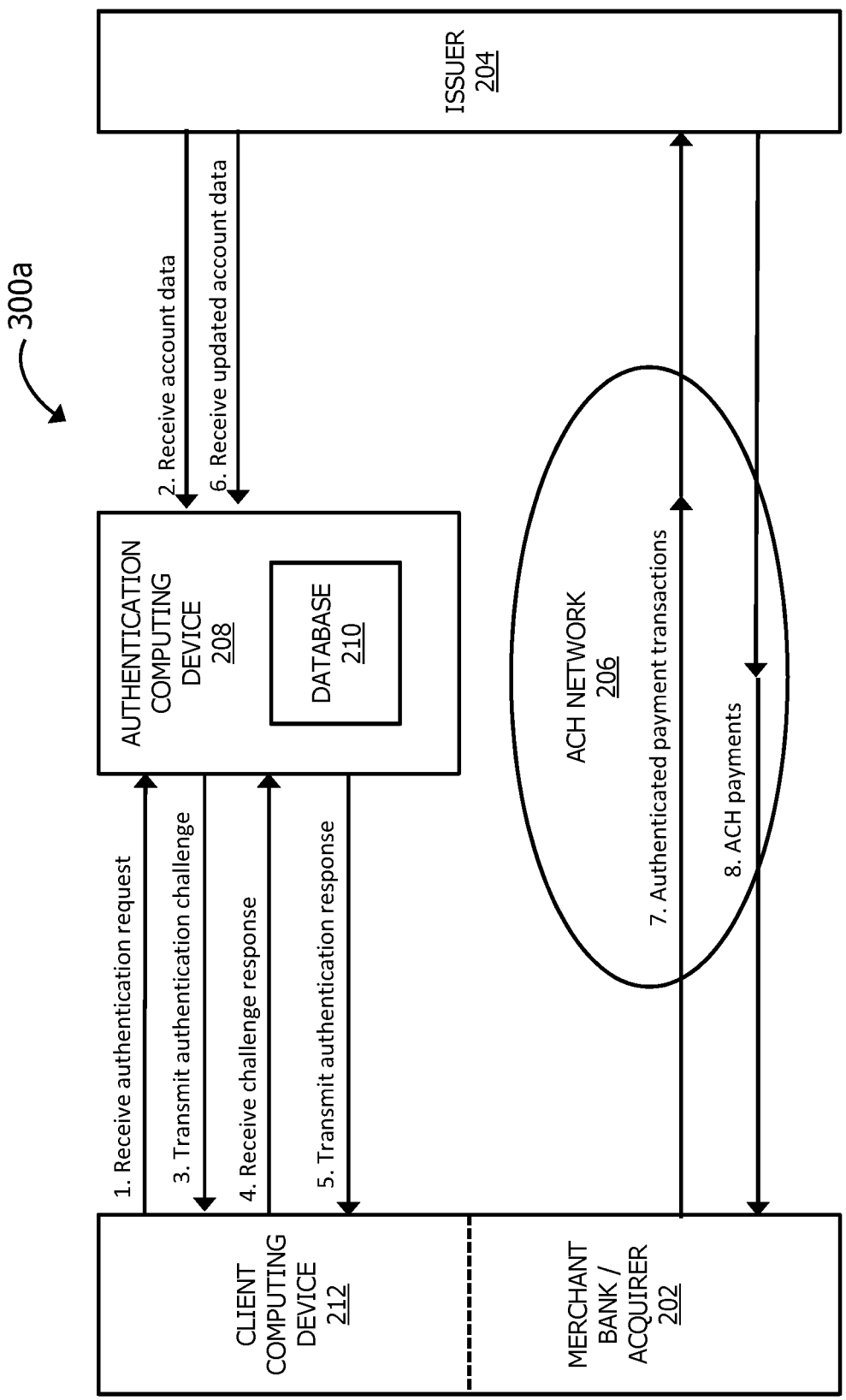
FIG. 3A is an example embodiment of a flow diagram illustrating the flow of data between various components of the ACH transaction authentication system shown in FIG. 2.

FIG. 3A is an example flow diagram illustrating the flow of data between various components of the ACH transaction authentication system 200 (shown in FIG. 2). In particular, FIG. 3A depicts the data flow 300a between authentication computing device 208 and one or more client computing devices 212. In the example embodiment, client computing device 212 is representative of a computing device and/or app associated with a merchant/payee (e.g., a merchant website, a merchant app, a merchant kiosk, a merchant POS device). ACH transactions submitted to the merchant/payee via client computing device 212 are handled by merchant bank/acquirer 202. Prior to the flow of data depicted in FIG. 3A, merchant/payee and/or merchant bank/acquirer 202 have registered with authentication computing device 208. In other embodiments, ACH transaction authentication system 200 may provide additional, fewer, or alternative data and data flow, including those described elsewhere herein.

In the example embodiment, authentication computing device 208 receives an authentication request from client computing device 212 (step 1, FIG. 3A). The authentication request includes at least one account identifier associated with a payor account (such as an account number and a routing number) that has been input at client computing device 212 by a user. The authentication request is a request for authentication of an electronic funds transfer directly from a payor account to a payee account (such as payor account 205 and payee account 203, respectively, as shown in FIG. 2) and includes the account identifier(s). In some embodiments, the authentication request may further include a transaction amount indicating the amount of funds to be transferred from the payor account to the payee account.

Account data associated with the account identifier is received by the authentication computing device (step 2, FIG. 3A). Responsive to receiving the request, the authentication computing device 208 transmits an authentication challenge to client computing device 212 based on account data associated with the account identifier (step 3, FIG. 3A). The authentication challenge may use the 3DS protocol or the challenge may be bypassed if the RBD component determines that the transaction can be verified without further challenges. As described herein, the authentication challenge may be at least one question or password prompt displayed to the user at client computing device 212. Authentication computing device 208 may store a set of rules and/or modules for creating and transmitting authentication challenges. The user's input to the authentication challenge, or challenge response, is received by authentication computing device 208 (step 4, FIG. 3A). Authentication computing device 208 then determines whether the account data has been authenticated based on the received challenge response. For instance, authentication computing device 208 may store a set of authentication rules and/or modules for authenticating the challenge response based on the account data associated with the account identifier. Once a determination has been made, the authentication computing device 208 transmits an authentication response to the client computing device 212 and accordingly to the merchant/payee (step 5, FIG. 3A). Data contained within the account data, authentication challenge, and challenge response is not accessible/visible to the merchant/payee. In this way, the user is able to authenticate the payor account without making information visible/available to the merchant that is additional to the account identifier. In the example embodiment, the authentication request is received at the authentication computing device 208 via a web call.

In some embodiments, the authentication computing device 208 is configured to receive updated account data (step 6, FIG. 3A) (e.g., for account data associated with account identifiers that have been previously subject to authentication) on a periodic basis (e.g., every day, every 2 days, every week, etc.) and/or when account data at the issuer has been updated. In these embodiments, subsequent request for authentication may not require receipt of account data at the authentication computing device 208 at step 2 prior to transmitting the authentication challenge at step 3. In these embodiments, account data associated with an account identifier may already be stored/cached in database 210 and up to date.

In some embodiments, account data received by authentication computing device may include a funds amount indicating an amount of funds available in the payor account. In these embodiments, wherein the authentication request also included a transaction amount, the authentication computing device 208 is further configured to embed a funds indicator within the authentication response prior to transmitting the response to the client computing device 212 and accordingly to the merchant/payee. The funds indicator conveys to the merchant/payee whether the payor account has sufficient funds to accommodate the transaction amount by indicating whether the funds amount is less than or greater than the transaction amount.

In embodiments when the transaction has been authenticated (and in some embodiments, if sufficient funds have been indicated), the merchant bank/acquirer 202 may then transmit the authenticated transaction to issuer 204 over ACH network 206 (step 7, FIG. 3A). The ACH transaction is processed, typically within one business day, and funds are transferred electronically over the ACH network 206 directly from the payor account to the payee account (205 and 203, respectively, as shown in FIG. 2; see step 8, FIG. 3A). In embodiments when the authentication response indicates that the transaction was not authenticated (i.e., failed the authentication process), the merchant bank/acquirer 202 may not include the transaction for submission to the issuer 204. In some embodiments, a transaction associated with a failed authentication may be cancelled by the merchant. In some embodiments, the user may be required to provide a different account identifier to complete the ACH transaction, or to provide a different form of payment (e.g., a non-ACH transaction such as a credit card or debit card) in order to complete the transaction.

Figure 3B:
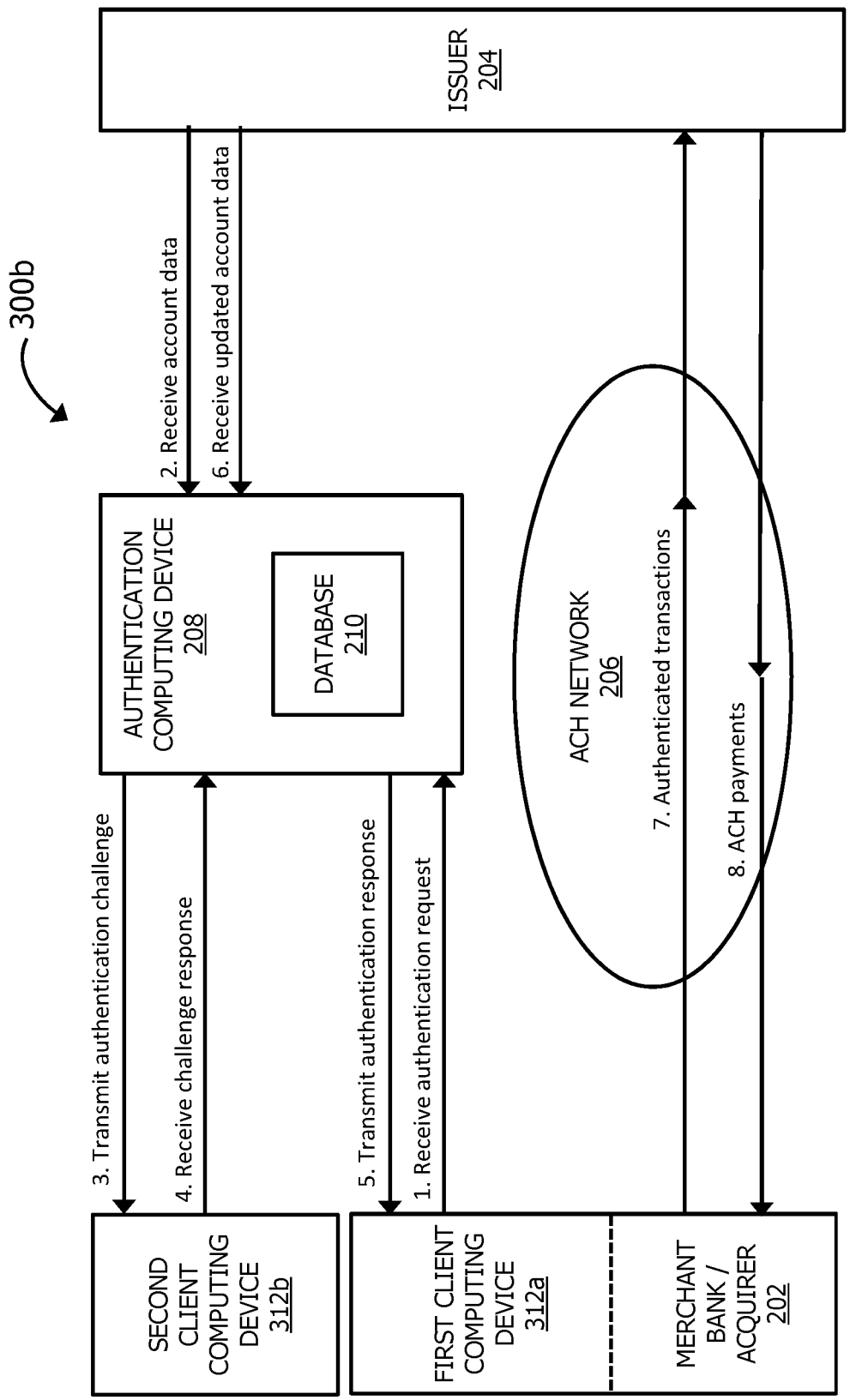
FIG. 3B is another example embodiment of a flow diagram illustrating the flow of data between various components of the ACH transaction authentication system shown in FIG. 2.

FIG. 3B is another example flow diagram illustrating the flow of data between various components of the ACH transaction authentication system 200 (shown in FIG. 2). In particular, FIG. 3B depicts the data flow 300b between authentication computing device 208 and one or more client computing devices 312. In this embodiment, first client computing device 312a is representative of a computing device and/or app associated with a merchant/payee (e.g., a merchant website, a merchant app, a merchant kiosk, a merchant POS device), while second client computing device 312b is representative of a computing device specifically associated with a user. ACH transactions submitted to the merchant/payee via client computing device 312a are handled by merchant bank/acquirer 202. Prior to the flow of data depicted in FIG. 3B, merchant/payee and/or merchant bank/acquirer 202 have registered with authentication computing device 208. In other embodiments, ACH transaction authentication system 200 may provide additional, fewer, or alternative data and data flow, including those described elsewhere herein.

In this embodiment, authentication computing device 208 receives an authentication request from client computing device 312a (step 1, FIG. 3B). The authentication request includes at least one account identifier associated with a payor account (such as an account number and a routing number) that has been input at client computing device 312a by a user. The authentication request is a request for authentication of an electronic funds transfer directly from a payor account to a payee account (such as payor account 205 and payee account 203, respectively, as shown in FIG. 2) and includes the account identifier(s). As described above, in some embodiments the authentication request may further include a transaction amount indicating the amount of funds to be transferred from the payor account to the payee account.

Account data associated with the account identifier is received by the authentication computing device (step 2, FIG. 3B). In contrast to the embodiment depicted in FIG. 3A (wherein the authentication computing device transmits an authentication response back to the same computing device from which the request was received, such as client computing device 212 in FIG. 3A or first computing device 312*a* in FIG. 3B) the authentication computing device 208 transmits an authentication challenge to second client computing device 312*b* based on account data associated with the account identifier (step 3, FIG. 3B). In this embodiment, authentication challenge may be at least one question or password prompt displayed to the user at second client computing device 312*b*. The authentication challenge may use the 3DS protocol or the challenge may be bypassed if the RBD component determines that the transaction can be verified without further challenges.

The user may then be required to input their answers and/or passwords at the second client computing device 312*b*. Additionally or alternatively, the authentication challenge may include a code (transmitted to the second client computing device 312*b*) that the user is required to enter at the first client computing device 312*a*. In these embodiments, authentication computing device 208 may store a set of rules and/or modules for creating and transmitting authentication challenges to first and/or second client computing devices 312*a*, 312*b*. In some embodiments, a portion of the authentication challenge may be transmitted to the first client computing device 312*a* and another portion of the authentication challenge may be transmitted to the second client computing device 312*b*.

Whether input to the first client computing device 312*a* and/or the second client computing device 312*b*, the user's input to the challenge response is received by authentication computing device 208 (step 4, FIG. 3B). Authentication computing device 208 then determines whether the account data has been authenticated based on the received challenge response. As described above with respect to FIG. 3A, authentication computing device 208 may store a set of authentication rules and/or modules for authenticating the challenge response based on the account data associated with the account identifier. Once a determination has been made, the authentication computing device 208 transmits an authentication response to the first client computing device 312*a* and accordingly to the merchant/payee (step 5, FIG. 3A). Data contained within the account data, authentication challenge, and challenge response is not accessible/visible to the merchant/payee. In some embodiments, the authentication request is received at the authentication computing device 208 via a web call.

In some embodiments, the authentication computing device 208 is configured to receive updated account data (step 6, FIG. 3B) on a periodic basis and/or when account data at the issuer has been updated. In these embodiments, subsequent request for authentication may not require receipt of account data at the authentication computing device 208 at step 2 prior to transmitting the authentication challenge at step 3. In these embodiments, account data associated with an account identifier may already be stored/cached in database 210 and up to date. In some embodiments, account data received by authentication computing device 208 may include a funds amount indicating an amount of funds available in the payor account. In these embodiments, wherein the authentication request also included a transaction amount, the authentication computing device 208 is further configured to embed a funds indicator within the authentication response prior to transmitting the response to the client computing device 212 and accordingly to the merchant/payee. The funds indicator conveys to the merchant/payee whether the payor account has sufficient funds to accommodate the transaction amount by indicating whether the funds amount is less than or greater than the transaction amount.

In embodiments when the transaction has been authenticated (and in some embodiments, if sufficient funds have been indicated), the merchant bank/acquirer 202 may then transmit the authenticated transaction to issuer 204 over ACH network 206 (step 7, FIG. 3B). The ACH transaction is processed, typically within one business day, and funds are transferred electronically over the ACH network 206 directly from the payor account to the payee account (step 8, FIG. 3B). In embodiments when the authentication response indicates that the transaction was not authenticated (i.e., failed the authentication process), the merchant bank/acquirer 202 may not include the transaction for submission to the issuer 204. In some embodiments, a transaction associated with a failed authentication may be cancelled by the merchant. In some embodiments, the user may be required to provide a different account identifier to complete the ACH transaction, or to provide a different form of payment (e.g., a non-ACH transaction such as a credit card or debit card) in order to complete the transaction.

Figure 4:
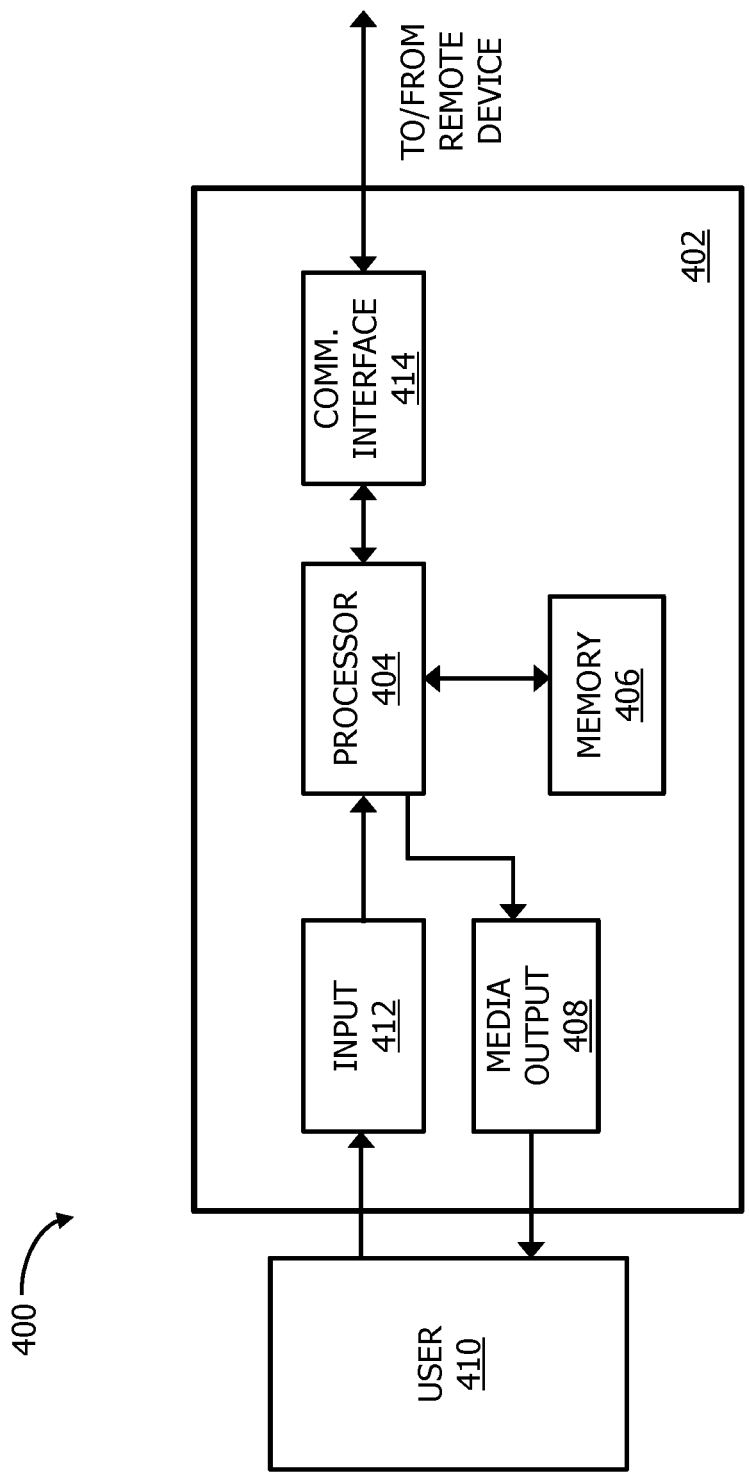

FIG. 4 depicts an exemplary configuration diagram 400 of a remote or client computing device 402, such as client 212, acquirer 202, and issuer 204 computing devices (shown in FIG. 2). Computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Remote computing device 402 also includes at least one media output component 408 for presenting information to a user 410. Media output component 408 is any component capable of conveying information to user 410. In some embodiments, media output component 408 includes an output adapter such as a video adapter and/or an audio adapter. An output adapter is operatively coupled to processor 404 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 408 is configured to present an interactive user interface (e.g., a web browser or client application) to user 410.

In some embodiments, remote computing device 402 includes an input device 412 for receiving input from user 410. Input device 412 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 412.

Computing device 402 may also include a communication interface 414, which is communicatively coupleable to a remote device such as authentication computing device 208 (shown in FIG. 2). Communication interface 414 may include, for example, a wired or wireless network adapter or a wireless data transceiver for use with a mobile phone network (e.g., Global System for Mobile communications (GSM), 3G, 4G, or Bluetooth) or other mobile data network (e.g., Worldwide Interoperability for Microwave Access (WIMAX)).

Stored in memory area 406 are, for example, computer-readable instructions for providing a user interface to user 410 via media output component 408 and, optionally, receiving and processing input from input device 412. A user interface may include, among other possibilities, a web browser and client application. Web browsers enable users 410 to display and interact with media and other information typically embedded on a web page or a website from a web server associated with, for example, a merchant. A client application allows users 410 to interact with a server application associated with, for example, authentication computing device 208 and/or other components of ACH transaction authentication system 200 (shown in FIG. 2). For instance, in some embodiments, remote computing device 402 is configured as client computing device 212 associated with a merchant/payee (e.g., a merchant app, a merchant website, a merchant kiosk, or a merchant POS device) interacting with authentication computing device 208 via media output component 408 and input device 412 to send an authentication request and receive an authentication response (see steps 1 and 5 in FIG. 3A), as well as to receive an authentication challenge and send a challenge response (see steps 3 and 4 in FIG. 3A). As another example, in some embodiments, remote computing device 402 is configured as a second client computing device 312b interacting with authentication computing device 208 via media output component 408 and input device 412 to receive an authentication challenge and send a challenge response (see steps 3 and 4 in FIG. 3B). In some embodiments, the authentication challenge transmitted to a second client computing device (such as device 312b shown in FIG. 3B) may be one or more codes that the user is required to enter via input device 412 of a first client computing device (such as device 312a shown in FIG. 3B). In these embodiments, the authentication computing device 208 transmits the authentication challenge to one client computing device and subsequently receives the challenge response from a different client computing device.

Figure 5:
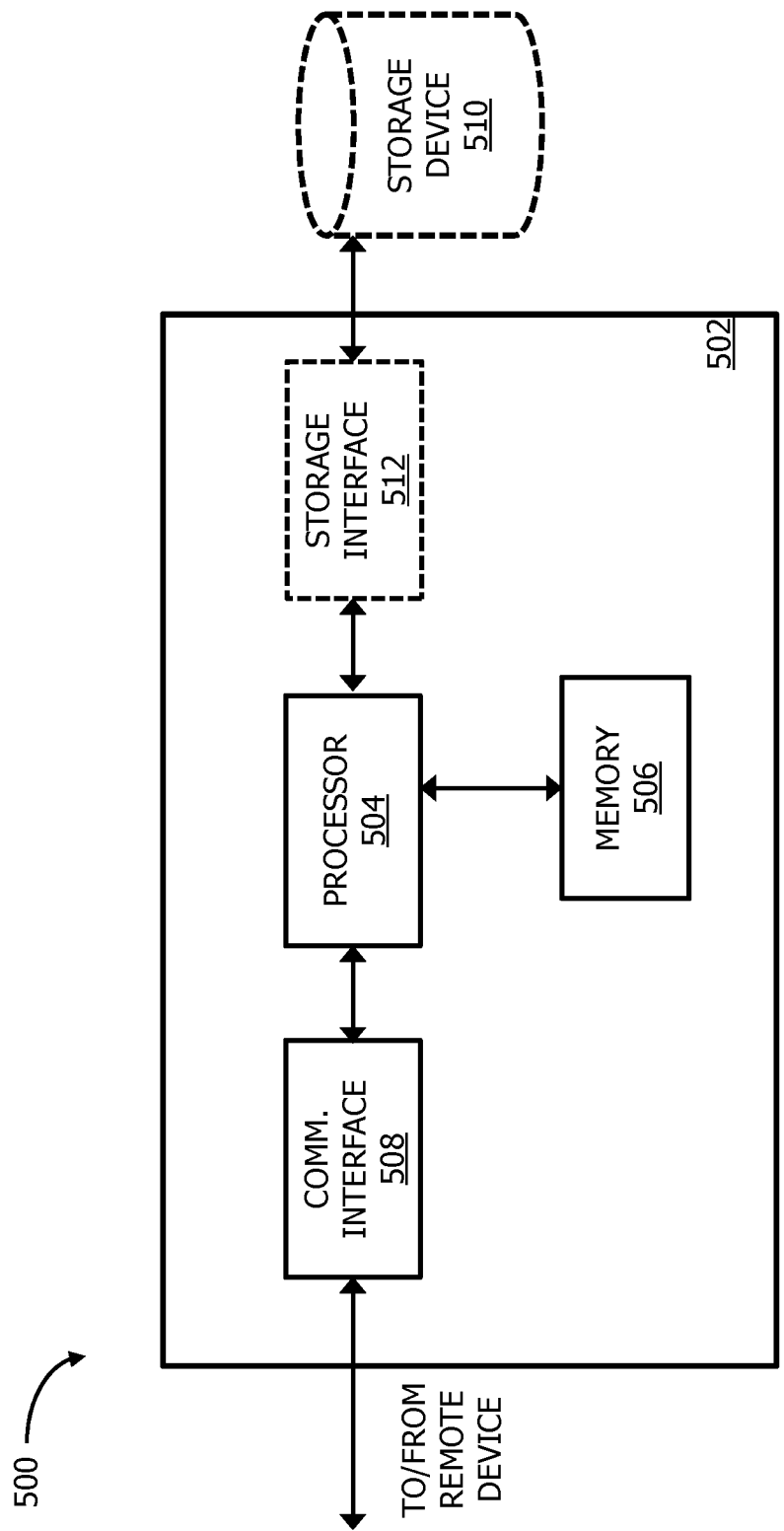

FIG. 5 illustrates an example configuration diagram 500 of a server computing device 502, such as authentication computing device 208 and ACH network 206 (shown in FIG. 2). Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as computing device 402 shown in FIG. 4 or another server computing device 502. For example, communication interface 508 of authentication computing device 208 may receive various data from client 212, acquirer 202, and issuer 204 computing devices via the Internet, as illustrated in FIG. 2. As another example, in embodiments when authentication computing device is integral to ACH network 206, communication interface 508 of ACH network 206 may receive ACH transactions from authentication computing device 208 to be completed via ACH transaction authentication system 200.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 406 (shown in FIG. 4) and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Figure 6:
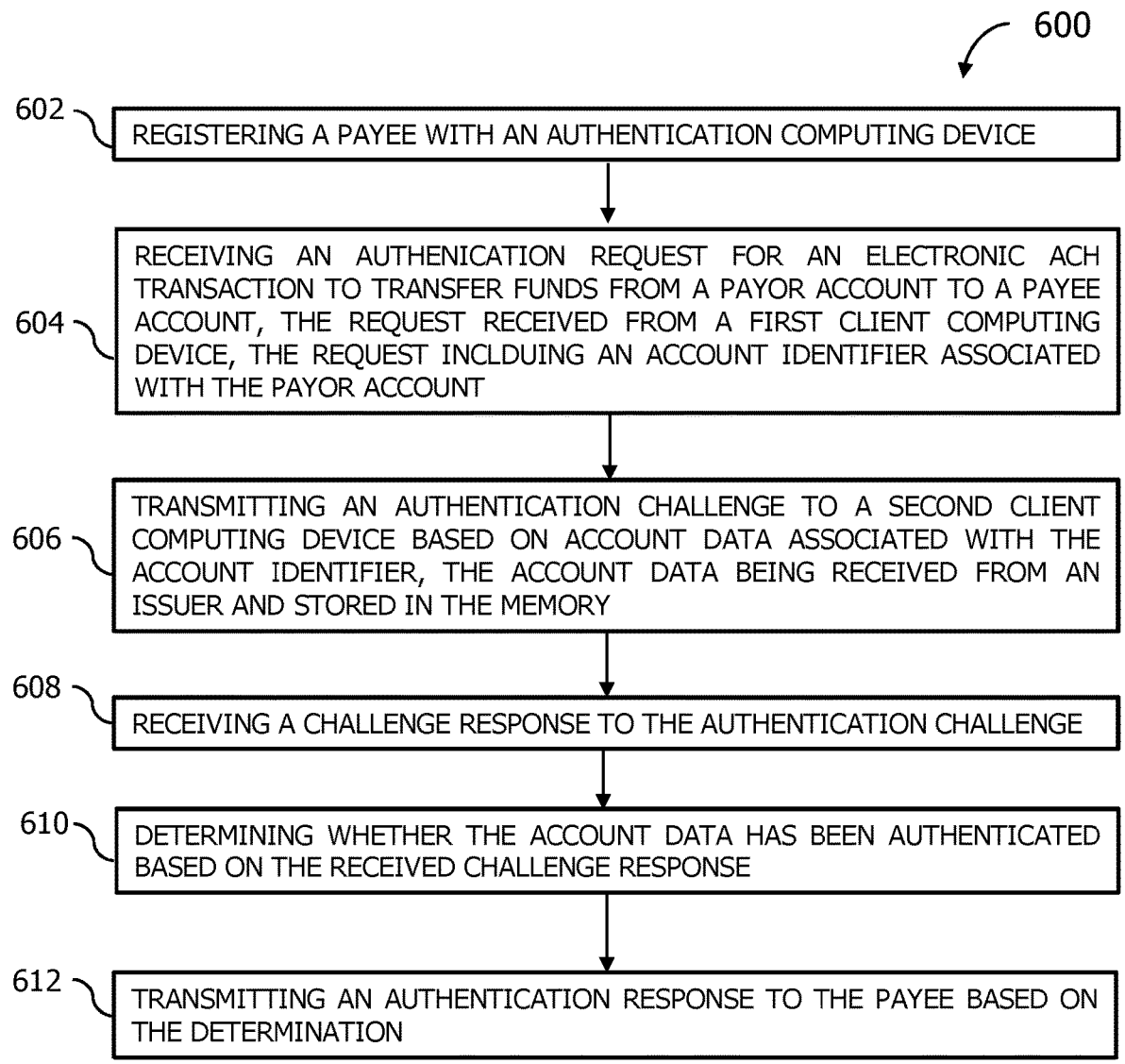

FIG. 6 is a flowchart of a method 600 performed by an ACH transaction authentication system, such as system 200 (shown in FIG. 2). In the example embodiment, method 600 is performed by an authentication computing device, such as authentication computing device 208 (shown in FIG. 2). In certain embodiments, method 600 may be at least partially performed by a different computing device. In other embodiments, method 600 may include additional, fewer, or alternative actions, including those described elsewhere herein.

Method 600 begins with the authentication computing device registering 602 a payee with the authentication computing device, and receiving 604 an authentication request for an electronic ACH transaction to transfer funds from a payor account to a payee account. The authentication request is received from a first client computing device and includes an account identifier associated with the payor account. The method also includes transmitting 606 an authentication challenge to a second client computing device based on account data associated with the account identifier, the account data being received from an issuer and stored in the memory. The method further includes receiving 608 a challenge response to the authentication challenge, and determining 610 whether the account data has been authenticated based on the received challenge response. The method additionally includes transmitting 612 an authentication response to the payee based on the determination.

In some embodiments of method 600, the first client computing device and the second client computing device are the same (for example, client computing device 212 shown in FIG. 3A). In other embodiments of method 600, the first client computing device and the second computing device are different (for example, first client computing device 312a and second client computing device 312b). In some embodiments of method 600, the account data, authentication challenge, and challenge response are not accessible to the payee. In some embodiments, receiving step 604 comprises receiving the authentication request via a web call. In some embodiments, method 600 further comprises updating the memory at least on a periodic basis and when the account data is changed at the issuer. In some embodiments, method 600 further comprises receiving a funds amount from the issuer and storing the funds amount in the memory, wherein the funds amount is associated with the account identifier and is indicative of the available amount in the payor account. Method 600 may further include updating the funds amount on a periodic basis and storing/re-caching it in the memory. In some embodiments, when the account data is determined to be authenticated and wherein the authentication request further includes a transaction amount, method 600 further comprises embedding a funds indicator within the authentication response, which indicates whether the funds amount is less than or greater than the transaction amount.

Figure 7:
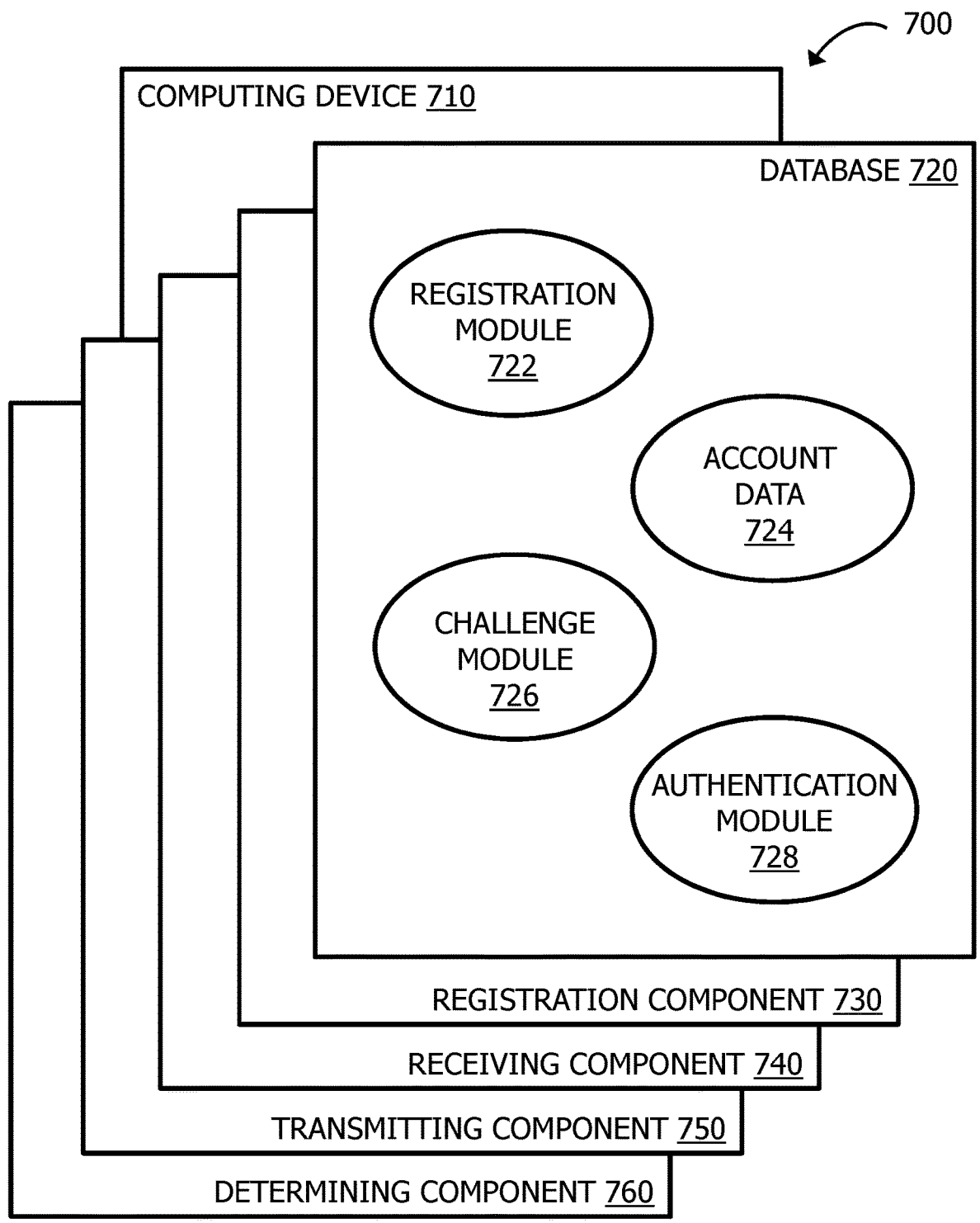

FIG. 7 is a diagram 700 of components of an example computing device 710 that may be used to perform method 600 shown in FIG. 6. In some embodiments, computing device 710 is similar to or the same as authentication computing device 208 (shown in FIG. 2). Computing device 710 includes a database 720 configured to store various information. Database 720 may be similar to or the same as database 210 (shown in FIG. 2). Database 720 may be coupled with several separate components within computing device 710, which perform specific tasks. In the illustrated embodiment, database 720 is divided into a plurality of sections and stores, including but not limited to, a registration module section 722, an account data section 724 (which may include and/or be similar to account data received at steps 2 and 6, shown in FIGS. 3A and 3B), a challenge module section 726 (which may include and/or be similar to authentication challenge data received at steps 3 and 4, shown in FIGS. 3A and 3B), and an authentication module section 728. Database 720 is interconnected to computing device 710 to receive, transmit, and/or update the information as required.

In the example embodiment, computing device 710 includes a registration component 730 configured to register a payee with the authentication computing device. Computing device 710 further comprises a receiving component 740 configured to receive an authentication request for an electronic ACH transaction to transfer funds from a payor account to a payee account. Receiving component 740 is also configured to receive a challenge response to the authentication challenge, as well as to receive account data from an issuer. Computing device 710 further includes a transmitting component 750 configured to transmit an authentication challenge to a second client computing device based on account data associated with the account identifier. Computing device 710 also comprises a determining component 760 configured to determine whether the account data has been authenticated based on the received challenge response. Transmitting component 750 is additionally configured to transmit an authentication response to the payee based on the determination made by determination component 760.

Described herein are computer systems such as a payment processor (such as an ACH network), a remote device (such as a merchant/payee computing device, a client computing device, and acquirer computing device and an issuer computing device) and an authentication computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above examples are for example only, and are thus not intended to limit in any way the definition and/or meaning of the term "processor."

The term database, as used herein, refers to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor (e.g., 304, 404), including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs))

used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

In addition, although various elements of the authentication computing device are described herein as including general processing and memory devices, it should be understood that the authentication computing device is a specialized computer configured to perform the steps described herein for providing authentication to ACH payment transactions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An authentication computing device for authenticating an ACH transaction processed over an ACH network, the authentication computing device including a processor in communication with a memory, said processor programmed to:
    register a payee with the authentication computing device, wherein the payee is a merchant;
    receive, by the authentication computing device, an ACH authentication request for an electronic ACH transaction initiated by a payor to transfer funds from a payor account to a payee account, the request received via Internet communication from a first application associated with the payee and executing on a first client computing device, the request including an account identifier associated with the payor account;
    retrieve, by the authentication computing device, in response to receiving the ACH authentication request, account data from an issuer of the payor account by performing a lookup using the account identifier at a database associated with the issuer, wherein the account data is stored in the memory and is not accessible to the payee;
    cause to be displayed, in response to receiving the ACH authentication request, via a second application associated with the authentication computing device and executed on at least a second client computing device, an ACH authentication challenge prompting the payor to respond to the ACH authentication challenge via the second application, wherein the second computing device is different from the first computing device and is associated, based on the retrieved account data, with a user of the payor account, wherein the ACH authentication challenge requests account data from the payor that is known to a legitimate payor associated with the payor account and is not known to the payee, and wherein the ACH authentication challenge is not accessible to the payee;
    receive, by the authentication computing device via Internet communication from the first application executing on the first computing device, an ACH challenge response to the ACH authentication challenge, wherein the ACH challenge response is not accessible to the payee;
    determine, by the authentication computing device, whether the ACH transaction is authenticated including determining that the payor is the legitimate payor associated with the payor account by comparing the received ACH challenge response with the account data retrieved from the issuer; and
    transmit, from the authentication computing device via Internet communication to the first application associated with the payee, an ACH authentication response based on the determination.

2. The authentication computing device of claim 1, wherein said processor is further programmed to update the memory at least on a periodic basis and when the account data is changed at the issuer.

3. The authentication computing device of claim 1, wherein said processor is further programmed to store in the memory a funds amount associated with the account identifier.

4. The authentication computing device of claim 3, wherein said processor is further programmed to update the funds amount in the memory on a periodic basis.

5. The authentication computing device of claim 3, wherein when the ACH transaction is determined to be authenticated and wherein the ACH authentication request further includes a transaction amount, said processor is further programmed to embed a funds indicator within the ACH authentication response, the funds indicator indicating whether the funds amount is less than or greater than the transaction amount.

6. The authentication computing device of claim 1 further comprising a risk-based decisioning (RBD) component, wherein said processor is further programmed to, prior to transmitting the ACH authentication challenge, evaluate the ACH transaction using the RBD component, wherein the RBD component generates a risk score indicating fraud risk of the ACH transaction based on at least one of device information and account data, and wherein said processor is further programmed to, when the RBD scores the ACH transaction as a high fraud risk, determine that the ACH authentication challenge should be presented to the payor.

7. The authentication computing device of claim 6, wherein the device information includes information associated with the first client device and comprises at least one of a unique hardware identifier and an IP address.

8. The authentication computing device of claim 6, wherein the account data includes information associated with the payor account and comprises at least one of dates of use, name, and address.

9. The authentication computing device of claim 1, wherein said processor is further programmed to, when the ACH challenge response matches the account data retrieved from the issuer:
    cause the ACH authentication response to be displayed via the first application, wherein the ACH authentication response indicates that the ACH transaction is authenticated such that the payor is determined to be the legitimate payor; and
    approve processing of the ACH transaction.

10. The authentication computing device of claim 1, wherein said processor is further programmed to, when the ACH challenge response does not match the account data retrieved from the issuer:
 cause the ACH authentication response to be displayed via the first application, wherein the ACH authentication response indicates that the ACH transaction is not authenticated such that the payor is not determined to be the legitimate payor; and
 deny processing of the ACH transaction.

11. A method for authenticating an ACH transaction processed over an ACH network, said method performed using an authentication computing device including a processor in communication with a memory, said method comprising:
 registering a payee with the authentication computing device, wherein the payee is a merchant;
 receiving, by the authentication computing device, an ACH authentication request for an electronic ACH transaction initiated by a payor to transfer funds from a payor account to a payee account, the request received via Internet communication from a first application associated with the payee and executing on a first client computing device, the request including an account identifier associated with the payor account;
 retrieving, by the authentication computing device, in response to receiving the ACH authentication request, account data an issuer of the payor account by performing a lookup using the account identifier at a database associated with the issuer, wherein the account data is stored in the memory and is not accessible to the payee;
 causing to be displayed, in response to receiving the ACH authentication request, via a second application associated with the authentication computing device and executed on at least a second client computing device, an ACH authentication challenge prompting the payor to respond to the ACH authentication challenge via the second application, wherein the second computing device is different from the first computing device and is associated, based on the retrieved account data, with a user of the payor account, wherein the ACH authentication challenge requests account data from the payor that is known to a legitimate payor associated with the payor account and is not known to the payee, and wherein the ACH authentication challenge is not accessible to the payee;
 receiving, by the authentication computing device via Internet communication from the first application executing on the first computing device, an ACH challenge response to the ACH authentication challenge, wherein the ACH challenge response is not accessible to the payee;
 determining, by the authentication computing device, whether the ACH transaction is authenticated including determining that the payor is determined to be the legitimate payor associated with the payor account by comparing the received ACH challenge response with the account data retrieved from the issuer; and
 transmitting, from the authentication computing device via Internet communication to the first application associated with the payee, an ACH authentication response based on the determination.

12. The method of claim 11, further comprising updating the memory at least on a periodic basis and when the account data is changed at the issuer.

13. The method of claim 11, further comprising storing in the memory a funds amount associated with the account identifier.

14. The method of claim 13, further comprising updating the funds amount in the memory on a periodic basis.

15. The method of claim 13, wherein when the ACH transaction is determined to be authenticated and wherein the ACH authentication request further includes a transaction amount, further comprising embedding a funds indicator within the ACH authentication response, the funds indicator indicating whether the funds amount is less than or greater than the transaction amount.

16. A non-transitory computer-readable storage medium having computer-executable instructions embodied thereon, wherein when executed by an authentication computing device including at least one processor coupled to a memory, the computer-executable instructions cause the authentication computing device to:
 register a payee with the authentication computing device, wherein the payee is a merchant;
 receive, by the authentication computing device, an ACH authentication request for an electronic ACH transaction initiated by a payor to transfer funds from a payor account to a payee account, the request received via Internet communication from a first application associated with the payee and executing on a first client computing device, the request including an account identifier associated with the payor account;
 retrieve, by the authentication computing device, in response to receiving the ACH authentication request, account data from an issuer of the payor account by performing a lookup using the account identifier at a database associated with the issuer, wherein the account data is stored in the memory and is not accessible to the payee;
 cause to be displayed, in response to receiving the ACH authentication request, via a second application associated with the authentication computing device and executed on at least a second client computing device, an ACH authentication challenge prompting the payor to respond to the ACH authentication challenge via the second application, wherein the second computing device is different from the first computing device and is associated, based on the retrieved account data, with a user of the payor account, wherein the ACH authentication challenge requests account data from the payor that is known to a legitimate payor associated with the payor account and is not known to the payee, and wherein the ACH authentication challenge is not accessible to the payee;
 receive, by the authentication computing device via Internet communication from the first application executing on the first computing device, an ACH challenge response to the ACH authentication challenge, wherein the ACH challenge response is not accessible to the payee;
 determine, by the authentication computing device, whether the ACH transaction is authenticated including determining that the payor is determined to be the legitimate payor associated with the payor account by comparing the received ACH challenge response with the account data retrieved from the issuer; and
 transmit, from the authentication computing device via Internet communication to the first application associated with the payee, an ACH authentication response based on the determination.

17. The non-transitory computer-readable storage media of claim 16, wherein said processor is further programmed to store in the memory a funds amount associated with the account identifier.

18. The non-transitory computer-readable storage media of claim 17, wherein when the ACH transaction is determined to be authenticated and wherein the ACH authentication request further includes a transaction amount, said processor is further programmed to embed a funds indicator within the ACH authentication response, the funds indicator indicating whether the funds amount is less than or greater than the transaction amount.

\* \* \* \* \*